Figure 1:
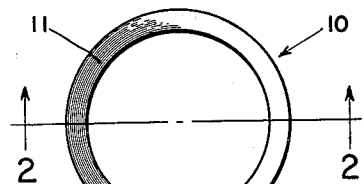

Aug. 27, 1963   M. CHRISTENSEN   3,101,532
SELF-LEVELING WELDING RING OF TRIANGULAR CROSS-SECTION
Filed Aug. 1, 1957

INVENTOR.
MAGNUS CHRISTENSEN
BY
*JF Moran*
ATTORNEY

United States Patent Office 3,101,532
Patented Aug. 27, 1963

3,101,532
SELF-LEVELING WELDING RING OF
TRIANGULAR CROSS-SECTION
Magnus Christensen, Alliance, Ohio, assignor to The Babcock & Wilcox Company, New York, N.Y., a corporation of New Jersey
Filed Aug. 1, 1957, Ser. No. 675,597
7 Claims. (Cl. 29—483)

This invention relates to the butt welding of tubes end-to-end and, more particularly, to a novel weld backing and filler ring for properly aligning the tube ends to be joined and forming the root of the butt weld.

When fusion butt welds are required to join tubular elements in the shop or in the field, the usual practice is to "back-up" the welded joint by means of a metal backing ring placed inside the elements in spanning relation with the abutting ends. The backing ring thus forms a continuous solid member as a base for the initial weld pass which joins the root edges of the machined or ground V-groove or U-groove to the backing ring. The latter is at least partially, and preferably, completely fused to form an integral part of the welded joint.

Such backing rings are usually a necessity in butt welding tubular elements, in order to obtain a uniformly satisfactory inside surface. When it is attempted to form a butt weld between tubular members without using a backing ring, a high degree of manipulative skill is required to avoid burning through the root, forming objectionable projections on the inner surface, or to avoid forming equally objectionable areas of non-fusion between the tube ends and the weld deposit. In practice, a satisfactory fusion butt weld between tubular elements is difficult if not imposisble to obtain without the use of a backing ring. While certain welding techniques and processes can be used to produce satisfactory root weld or initial passes, these techniques and processes leave something to be desired with respect to assurance of quality of the welded joint and have in common the disadvantage of difficulty in controlling penetration.

The use of backing rings in forming fusion butt welds between tubular elements promotes confidence in the welding operator and permits a welder of average skill to produce a joint which is satisfactory from the standpoint of internal projections and unfused areas. However, while many thousands of these joints formed with backing rings have given satisfactory service for years, failures have occurred in defective welds containing stress-raising notches. In addition, the backing rings projecting on the inner surface of the joints obstruct uniform fluid flow, and the turbulence caused by the inside projections has promoted failure of the joint by cavitation and erosion. All of these factors have resulted in a growing dissatisfaction with fusion butt welded joints involving backing rings on the inner surface of the joints.

In accordance with the present invention, a self-aligning backing and weld filler ring is provided which is disposed between the ends of the tubular elements and with little or no projection from the inner surfaces of the elements and supplies a substantial part of the metal of the root pass of the weld. The ring assures good fit up of the elements, offers substantially no obstruction to fluid flow, and provides the required solid backing for the weld root pass promoting operator confidence.

More particularly, the backing and filler ring forming the subject matter of this invention comprises a metal ring of triangular cross-section with the apex of the triangle at the inner periphery of the ring. The inner diameter of the ring is substantially equal to, or very slightly less than, the inner diameter of the tubular elements to be butt welded.

The angle between each work engaging surface (or side) of the ring and a diametric plane through the ring is substantially equal to the angle between the contoured end surface of the tubular work element engaged with such side and a right plane through such work element. Thus, these mating frusto-conical surfaces effect a substantially automatic alignment of each element with the ring and with each other. Preferably, the cross-section of the ring is an isoceles triangle, with a relatively sharp apex angle of 45 degrees or less.

In making a fusion butt weld, the ring is first centered on the contoured or bevelled end of one tubular work element and then tack welded thereto. Centering may be effected either by eye or by the use of a centering gauge. The second tubular element is then similarly centered on the ring and tack welded thereto. The fusion butt weld is now made in the usual manner by depositing molten weld metal into the welding groove to fuse with the metal of the work elements and ring, with the ring being fused into the weld deposit.

Figure 3:
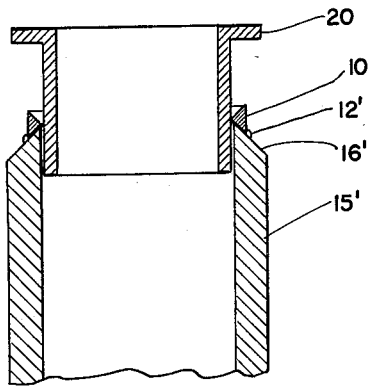
Figure 2:
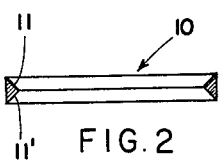
Figure 5:
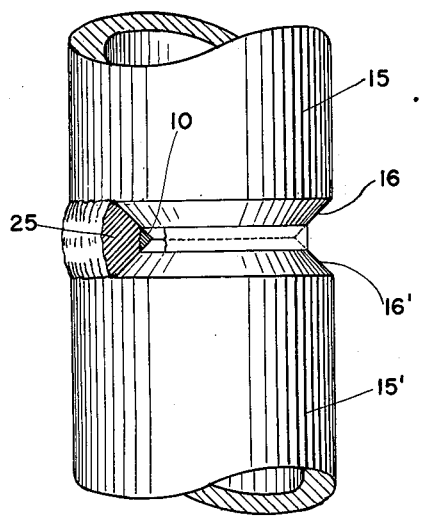
Figure 4:
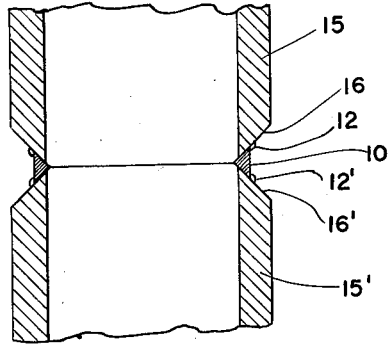

For an understanding of the invention principles, reference is made to the following description of a typical embodiment thereof as illustrated in the accompanying drawing. In the drawing:

FIG. 1 is a plan view of the welding ring;
FIG. 2 is a diametric sectional view thereof;
FIG. 3 is an axial sectional view illustrating centering of the ring on one tubular work element and tack welding of the ring thereto;
FIG. 4 is an axial sectional view illustrating both work elements centered on the ring and tack welded thereto; and
FIG. 5 is an axial sectional view of the completed fusion butt weld.

Referring to FIGS. 1 and 2, the backing and filler ring 10 is a metal annulus of triangular cross-section, with the apex of the triangle at the inner periphery of the ring. Preferably, the triangle is isoceles with an apex angle of 45 degrees or less. However, the type of triangle and the size of the apex angle may be varied in accordance with the particular conditions pertinent to a specific welding operation in which the ring is to be used.

The criterion controlling the shape of the triangle is the requirement that the angle between a side 11, 11' of the triangle and a diametric plane through ring 10 should be substantially equal to the angle between the juxtaposed bevelled end surface 16, 16' of the tubular work element 15, 15' and a right plane through the tubular work element. Thereby, the side 11, 11' of ring 10 will have substantially surface-to-surface engagement with surface 16, 16' providing good alignment and fit up of the components.

Referring to FIGS. 3 and 4, in advance of fusion butt welding elements 15 and 15' to each other, ring 10 is placed on the bevelled surface 16' of element 15' and centered thereon either by eye or by the use of a centering gauge 20. Ring 10 is then tack welded to surface 16', as at 12' after which the bevelled end 16 of element 15 is centered on ring 10 and axially aligned with ring 10 and element 15'. Ring 10 is then tack welded to surface 16 as at 12.

The inner diameter of ring 10 is made equal to the inner diameter of elements 15, 15' with a tolerance of —0.025" so that, at the most, the inner edge of ring 10 projects not more than 0.025" into the interior of the joint.

After the three components are thus axially aligned and tack welded together, elements 15, 15' are united by a fusion weld deposit 25 thoroughly fused with surfaces 16, 16', as shown in FIG. 5, and preferably effecting complete fusion of ring 10. The ring 10 prevents burn-through at the root of the weld so that there are no undesirable projections from the inner surface of the welded joint. As the ring is thoroughly fused during the fusion welding operation, the inner edge of the ring merges smoothly with the inner surfaces of elements 15, 15'.

While a specific embodiment of the invention has been shown and described in detail to illustrate the application of the invention principles, it will be understood that the invention may be embodied otherwise without departing from such principles.

What is claimed is:

1. A method of butt welding a pair of tubular members in end-to-end relationship comprising the steps of forming a bevel on the ends of the respective tubular members so that when said beveled ends of said tubular members are arranged in substantially end-to-end relationship an outwardly opening V-shaped welding groove is formed therebetween, centering a backing and filler ring of triangular cross-section and having an inner diameter substantially equal to the inner diameter of said tubular members and an outer diameter less than the outer diameter of said tubular members to the beveled end of one tube so that the apex of the triangular ring substantially coincides with the inner diameter of the tube with the side of said ring being disposed in abutting relationship to the beveled end of said one tube, tack welding said centered ring to said one tube, centering the beveled end of the other tube onto the other side of said ring, tack welding said centered second tube to said ring, and depositing a molten weld material into the remaining portion of the groove so as to fuse together the tubular members and ring positioned therebetween.

2. A method of butt welding a pair of tubular members in end-to-end relationship comprising the steps of forming a bevel on the ends of the respective tubular members so that when said beveled ends of said tubular members are arranged in substantially end-to-end relationship an outwardly opening V-shaped welding groove is formed therebetween, centering a backing and filler ring of triangular cross section and having an inner diameter substantially equal to the inner diameter of said tubular members and an outer diameter less than the outer diameter of said tubular members to the beveled end of one tube so that the apex of the triangular ring substantially coincides with the inner diameter of the tube with the side of said ring being disposed in abutting relationship to the beveled end of said one tube, centering the beveled end of the other tube onto the other side of said ring, and depositing a molten weld material into said welding groove so as to fuse together the tubular members and said ring positioned therebetween.

3. In combination, a pair of tubular elements and a preformed weld backing and filler ring providing a solid backing for and inclusion in the root pass in fusion butt welding in end-to-end relation said tubular elements, said tubular elements having beveled ends forming, when arranged in substantially abutting relation, a welding groove having an outwardly opening V-shaped cross section, said ring comprising a bare metal of substantially the same character of the metal of said tubular elements and adapted to fuse with the metal of said tubular elements upon the application of welding heat, said ring comprising an annulus having connecting sides defining a triangle in cross section with the apex of the triangle at the inner periphery of said annulus, the inner diameter of said annulus being substantially equal to the inner diameter of said tubular elements and its outer diameter substantially less than the outer diameter of said tubular elements, said ring engaging said tubular elements with its sides adjacent said apex in substantially abutting relationship with said beveled ends, and means for maintaining said ring in engagement with said tubular elements.

4. In combination, a pair of tubular elements and a preformed weld backing and filler ring providing a solid backing for and inclusion in the root pass in fusion butt welding in end-to-end relation said tubular elements, said tubular elements having beveled ends forming, when arranged in substantially abutting relation, a welding groove having an outwardly opening V-shaped cross section, said ring comprising an uncoated metal of substantially the same character as the metal of said tubular elements and adapted to fuse with the metal of said tubular elements upon the application of welding heat, said ring comprising an annulus having connecting sides defining a triangle in cross section with the apex of the triangle at the inner periphery of said annulus, the inner diameter of said annulus being substantially equal to the inner diameter of said tubular elements with a very small minus tolerance and its outer diameter substantially less than the outer diameter of said tubular elements, said ring engaging said tubular elements with its sides adjacent said apex in substantially abutting relationship with said beveled ends, and means for maintaining said ring in engagement with said tubular elements.

5. In combination a pair of tubular elements and a preformed weld backing and filler ring providing a solid backing for and inclusion in the root pass in fusion butt welding in end-to-end relation said tubular elements, said tubular elements having beveled ends forming, when arranged in substantially abutting relation, a welding groove having an outwardly opening V-shaped cross section, said ring comprising a bare metal of substantially the same character as the metal of said tubular elements and adapted to fuse with the metal of said tubular elements upon the application of welding heat, said ring comprising an annulus having connecting sides defining a triangle in cross section with the apex of the triangle at the inner periphery of said annulus, the inner diameter of said annulus being substantially equal to the inner diameter of said tubular elements and its outer diameter substantially less than the outer diameter of said tubular elements, said ring engaging said elements with its sides adjacent said apex in substantially abutting relationship with said beveled ends whereby the angle between either side of said triangle and a diametric plane of said annulus is substantially equal to the angle between the beveled end surface of the tubular element adjacent said side and a right plane through said adjacent tubular element, and means for maintaining said ring in engagement with said tubular elements.

6. In combination, a pair of tubular elements and a preformed weld backing and filler ring providing a solid backing for and inclusion in the root pass in fusion butt welding in end-to-end relation said tubular elements, said tubular elements having beveled ends forming, when arranged in substantially abutting relation, a welding groove having an outwardly opening V-shaped cross section, said ring comprising a bare metal of substantially the same character as the metal of said tubular elements and adapted to fuse with the metal of said tubular elements upon the application of welding heat, said ring comprising a unitary annulus having connecting sides defining a triangle in cross section with the apex of the triangle at the inner periphery of said annulus, the inner diameter of said annulus being substantially equal to the inner diameter of said tubular elements with a very small minus tolerance and its outer diameter substantially less than the outer diameter of said tubular elements, said ring engaging said elements with its sides adjacent said apex in substantially abutting relationship with said beveled ends whereby the angle between either side of said triangle and a diametric plane of said annulus is substantially equal to the angle between the beveled end surface of the tubular element adjacent said side and a right plane through said adjacent tubular element, and means for maintaining said ring in engagement with said tubular elements.

7. The combination as claimed in claim 5 in which the ring is of an isosceles triangular cross section.

(References on following page)

References Cited in the file of this patent

UNITED STATES PATENTS

| | | |
|---|---|---|
| 84,864 | Densmore | Dec. 15, 1868 |
| 304,276 | Nuttall | Aug. 26, 1884 |
| 385,384 | Thomson | July 3, 1888 |
| 1,332,186 | Fay | Feb. 24, 1920 |
| 1,643,227 | Stresau | Sept. 20, 1927 |
| 1,939,772 | Greene | Dec. 19, 1933 |
| 1,950,393 | Boardman | Mar. 13, 1934 |
| 1,977,987 | Corby | Oct. 23, 1934 |
| 1,978,178 | Taylor | Oct. 23, 1934 |
| 1,990,077 | Kershaw | Feb. 5, 1935 |
| 2,141,021 | Rooke et al. | Dec. 20, 1938 |
| 2,146,901 | Lane | Feb. 14, 1939 |
| 2,173,109 | Hamblin | Sept. 19, 1939 |
| 2,182,796 | Deming | Dec. 12, 1939 |
| 2,753,428 | Graham | July 3, 1956 |
| 2,792,490 | Risch et al. | May 14, 1957 |
| 3,033,145 | Thielsch | May 8, 1962 |

FOREIGN PATENTS

| | | |
|---|---|---|
| 717,038 | Great Britain | Oct. 20, 1954 |